United States Patent
Lyons

(10) Patent No.: US 7,521,514 B2
(45) Date of Patent: Apr. 21, 2009

(54) EMULSION POLYMERIZATION OF DIPOLYMERS OF TETRAFLUOROETHYLENE AND 3,3,3-TRIFLUOROPROPENE

(75) Inventor: Donald F. Lyons, Wilmington, DE (US)

(73) Assignee: Dupont Performance Elastomers LLC, Wilmington, DE (US)

(*) Notice: Subject to any disclaimer, the term of this patent is extended or adjusted under 35 U.S.C. 154(b) by 28 days.

(21) Appl. No.: 11/712,252

(22) Filed: Feb. 27, 2007

(65) Prior Publication Data

US 2007/0232769 A1    Oct. 4, 2007

Related U.S. Application Data

(60) Provisional application No. 60/788,854, filed on Apr. 3, 2006.

(51) Int. Cl.
  C08F 4/00      (2006.01)
  C08F 12/20    (2006.01)
  C08F 14/08    (2006.01)
  C08F 114/18  (2006.01)
  C08F 214/18  (2006.01)

(52) U.S. Cl. .......... 526/250; 526/91; 526/242; 526/255

(58) Field of Classification Search .......... 526/242, 526/250
See application file for complete search history.

(56) References Cited

U.S. PATENT DOCUMENTS

| | | | |
|---|---|---|---|
| 2,484,530 A | | 10/1949 | Schroeder |
| 3,853,828 A | * | 12/1974 | Wall et al. ............ 525/326.3 |
| 4,380,618 A | | 4/1983 | Khan et al. |
| 4,621,116 A | | 11/1986 | Morgan |
| 5,182,342 A | | 1/1993 | Feiring et al. |
| 5,286,822 A | | 2/1994 | Krespan et al. |
| 5,955,556 A | * | 9/1999 | McCarthy et al. ......... 526/249 |
| 6,770,404 B1 | | 8/2004 | Wheland et al. |
| 6,824,930 B1 | | 11/2004 | Wheland et al. |
| 2004/0013971 A1 | | 1/2004 | Berger et al. |
| 2004/0038151 A1 | | 2/2004 | Berger et al. |

OTHER PUBLICATIONS

Daniel W. Brown and Leo A. Wall, The Radiation-Induced Copolymerization of Tetrafluoroethylene and 3,3,3-Trifluoropropene At High Pressure, Polymer Preprints Amer. Chem. Soc., 1986, 7(2), 1116-1127.

Derwent Abstract—Japanese Patent Application Kokai 2000026616, published Jan. 25, 2000.

* cited by examiner

*Primary Examiner*—Marc S Zimmer
*Assistant Examiner*—Nicole M Buie

(57) ABSTRACT

An aqueous semi-batch polymerization process is disclosed for the manufacture of dipolymers of tetrafluoroethylene and 3,3,3-trifluoropropene that contain between 45 and 95 mole percent tetrafluoroethylene and between 5 and 55 mole percent 3,3,3-trifluoropropene.

7 Claims, No Drawings

EMULSION POLYMERIZATION OF DIPOLYMERS OF TETRAFLUOROETHYLENE AND 3,3,3-TRIFLUOROPROPENE

CROSS REFERENCE TO RELATED APPLICATIONS

This application claims the benefit of U.S. Provisional Application No. 60/788,854 filed Apr. 3, 2006.

FIELD OF THE INVENTION

This invention relates to an aqueous emulsion polymerization process for the manufacture of dipolymers of tetrafluoroethylene and 3,3,3-trifluoropropene.

BACKGROUND OF THE INVENTION

Dipolymers of tetrafluoroethylene (TFE) and 3,3,3-trifluoropropene (TFP) show utility in various molded plastic products and in coatings. The major challenge for the preparation of such dipolymers is the absence of any convenient methods that do not require the use of expensive, high pressure reactors, or that do not require organic solvents, which must be recovered and recycled after each use.

Preparation of TFE/TFP polymers is disclosed in U.S. Pat. No. 2,484,530. Pressures of up to 1000 atmospheres are required to produce these polymers. Such high pressures are dangerous on an industrial scale because of the propensity of TFE to deflagrate.

Brown and Wall (Polymer Preprints Amer. Chem. Soc., 1966, 7(2), 1116) prepared several dipolymers of TFE and TFP by using radiation-induced polymerization and a cobalt-60 radiation source. Conversion was under 15%. Use of radioactive material in an industrial process is expensive and impractical due to the requirements of handling the isotope and the extensive shielding needed to protect workers from radiation.

Preparation of TFE/TFP dipolymers in solvents and with a free radical initiator is taught in U.S. Pat. Nos. 5,182,342, 5,286,822, 6,824,930 B1, 6,770,404 B1, U.S. 2004013971 A1, and U.S. 2004038151 A1. When a TFE/TFP dipolymer is prepared in this manner, the solvent must be recovered from the polymerization reactor and the polymer must be extensively dried to remove all traces of solvent.

Therefore it remains a general problem in the field of fluoropolymers to provide a TFE/TFP dipolymer that has high molecular weight and has been produced without the presence of solvents.

SUMMARY OF THE INVENTION

An aspect of the present invention is a semi-batch polymerization process for the manufacture of a dipolymer of tetrafluoroethylene and 3,3,3-trifluoropropene, said process comprising:
  A) charging a reactor with a quantity of an aqueous solution;
  B) pressurizing said reactor to a pressure between 0.3 and 10.0 MPa with a first gaseous monomer mixture consisting of between 100 and 95 mole percent tetrafluoroethylene and between 0 and 5 mole percent 3,3,3-trifluoropropene to form a reaction mixture;
  C) polymerizing said reaction mixture in the presence of a free radical initiator to form a polymer dispersion while maintaining said reactor at said pressure and at a temperature between 25° C. and 130° C.; and
  D) feeding to said reactor a quantity of a second gaseous monomer mixture at a rate so as to maintain said pressure in said reactor, said second gaseous monomer mixture consisting of between 45 and 95 mole percent tetrafluoroethylene and between 5 and 55 mole percent 3,3,3-trifluoropropene to form a dispersed dipolymer of tetrafluoroethylene and 3,3,3-trifluoropropene.

DETAILED DESCRIPTION OF THE INVENTION

The present invention is directed to the manufacture of fluorine-containing polymers that have excellent processability and fuel resistance properties.

The fluoropolymers produced by the process of this invention consist of copolymerized units of tetrafluoroethylene (TFE) and 3,3,3-trifluoropropene (TFP). Preferably the fluoropolymers contain between 45 and 95 (most preferably 70-85) mole percent of TFE and between 5 and 55 (most preferably 15-30) mole percent TFP, based on the total moles of copolymerized units of TFE and TFP in the dipolymers.

Optionally, a chain transfer agent may be employed in the polymerization process of this invention to control the average molecular weight of the polymer. Typical chain transfer agents include low molecular weight hydrocarbons such as ethane, propane, and pentane, and halogenated compounds such as carbon tetrachloride, chloroform, iodotridecafluorohexane, 1,4-diiodooctafluorobutane. One skilled in the art can envision many other chain transfer agents that can be used in this process. If a chain transfer agent is employed, fragments of the agent will become endgroups of the TFE/TFP dipolymer.

In the semi-batch emulsion polymerization process of this invention, a first gaseous monomer mixture is introduced into a reactor that contains an aqueous solution. The reactor is typically not completely filled with the aqueous solution, so that a vapor space remains. The aqueous solution may optionally comprise a fluorosurfactant dispersing agent such as ammonium perfluorooctanoate, ammonium 3,3,4,4-tetrahydrotridecafluorooctanoate, Zonyl® FS-62 (available from DuPont) or Zonyl® 1033D (available from DuPont). Optionally the aqueous solution may contain a pH buffer such as a phosphate or acetate buffer for controlling the pH of the polymerization reaction. Instead of a buffer, a base, such as NaOH, NH$_4$OH, or CsOH may be used to control pH. Alternatively, or additionally, a pH buffer or base may be added to the reactor at various times throughout the polymerization reaction, either alone or in combination with other ingredients such as polymerization initiator or chain transfer agent. Also optionally, the initial aqueous solution may contain a polymerization initiator such as a water-soluble inorganic peroxide or an organic peroxide. Suitable peroxides include hydrogen peroxide, ammonium persulfate (or other persulfate salt), di-tertiary butyl peroxide, disuccinic acid peroxide, and tertiary butyl peroxyisobutyrate. The initiator may be a combination of an inorganic peroxide and a reducing agent such as the combination of ammonium persulfate and ammonium sulfite.

The amount of the first gaseous mixture charged to the reactor (sometimes referred to as "initial charge") is set so as to result in a reactor pressure between 0.3 MPa and 10 MPa (preferably between 0.3 and 3 MPa). The composition of the first gaseous mixture consists of 95-100 mole percent TFE and 0-5 mol percent TFP. If the initial monomer charge contains greater than 5 mol percent TFP, the polymerization rate will be uneconomically slow or the reactor will have to be pressurized in excess of 10 MPa, which may lead to explosions and loss of reactor integrity.

The first gaseous monomer mixture is dispersed in the aqueous solution while the reaction mixture is agitated, typically by mechanical stirring. The resulting mixture is termed a reaction mixture.

Optionally, a chain transfer agent may also be introduced at this point in the process. The entire amount of chain transfer agent may be added at one time, or addition may be spread out over time, up to the point when 100 percent of the second gaseous monomer mixture (as defined hereinafter) has been added to the reactor.

The temperature of the semi-batch reaction mixture is maintained in the range of 25° C.-130° C., preferably 30° C.-90° C. throughout the polymerization process. Polymerization begins when the initiator either thermally decomposes or reacts with reducing agent and the resulting radicals react with dispersed monomer to form a polymer dispersion.

Additional quantities of the monomers (referred to herein as the "second gaseous monomer mixture" or "incremental monomer mixture feed") are added at a controlled rate throughout the polymerization in order to maintain a desired reactor pressure at a controlled temperature. The relative ratio of the monomers in the second gaseous monomer mixture is set to be approximately the same as the desired ratio of copolymerized monomer units in the resulting fluoropolymer. Thus, the second gaseous monomer mixture consists of between 45 and 95 (preferably 70-85) mole percent, based on the total moles of monomers in the monomer mixture, of TFE and between 5 and 55 (preferably 15-30) mole percent of TFP. Additional chain transfer agent may, optionally, be continued to be added to the reactor at any point during this stage of the polymerization process. Additional fluorosurfactant and polymerization initiator may also be fed to the reactor during this stage.

The amount of dipolymer formed is approximately equal to the cumulative amount of the second gaseous monomer mixture fed to the reactor. One skilled in the art will recognize that the molar ratio of monomers in the second gaseous monomer mixture is not necessarily exactly the same as that of the desired copolymerized monomer unit composition in the resulting dipolymer because the composition of the first gaseous monomer charge may not be exactly that required for the desired final dipolymer composition or because a portion of the monomers in the second gaseous monomer mixture may dissolve, without reacting, into the polymer particles already formed.

Total polymerization times in the range of from 2 to 30 hours are typically employed in this semi-batch polymerization process.

The resulting dipolymer dispersion may be isolated, filtered, washed, and dried by conventional techniques employed in the fluoropolymer manufacturing industry. See, for example, Ebnesajjad, S., "Fluoroplastics, Vol. 2: Melt Processible Fluoropolymers" Plastics Design Library, 2003.

The dipolymers of this invention are useful in many industrial applications including molded plastic products and coatings.

EXAMPLES

Example 1

A TFE/TFP dipolymer was prepared by an aqueous semi-batch emulsion polymerization process of the invention, carried out at 70° C. in a well-stirred reaction vessel. 24.0 kg of a 0.5 wt. % solution of perfluorohexylethylsulfonic acid was charged to a 33 L reactor and heated to 70° C. The reactor headspace was pressurized to 2.17 MPa with a first gaseous monomer mixture of 97 mole percent tetrafluoroethylene and 3 mole percent 3,3,3-trifluoropropene. Polymerization was commenced by adding 200 mL of a solution containing 7 wt. % ammonium persulfate/5 wt. % diammonium phosphate. The reactor pressure dropped in response to polymerization. Reactor pressure was maintained at 2.17 MPa by addition of a second gaseous monomer mixture of 85 mole percent tetrafluoroethylene and 15 mole percent 3,3,3-trifluoropropene. Additional 7 wt. % ammonium persulfate/5 wt. % diammonium phosphate solution was added to maintain the polymerization. After 8000 grams of the second gaseous monomer mixture were added to the reactor, the reactor was cooled and depressurized to stop the polymerization. Cycle time (time between introduction of initiator and when 8000 g of the second gaseous monomer mixture had been added) was 13.8 hours. A 27.16 wt. % solids latex was obtained. The dipolymer was coagulated with aluminum sulfate and dried.

Example 2

A TFE/TFP dipolymer was prepared by an aqueous semi-batch emulsion polymerization process of the invention, carried out at 70° C. in a well-stirred reaction vessel. 24.0 kg of a 0.5 wt. % solution of perfluorohexylethylsulfonic acid was charged to a 33 L reactor and heated to 70° C. The reactor headspace was pressurized to 1.34 MPa with a first gaseous monomer mixture of 97 mole percent tetrafluoroethylene and 3 mole percent 3,3,3-trifluoropropene. Polymerization was commenced by adding 200 mL of a solution containing 7 wt. % ammonium persulfate/5 wt. % diammonium phosphate. The reactor pressure dropped in response to polymerization. Reactor pressure was maintained at 1.34 MPa by addition of a second gaseous monomer mixture of 79 mole percent tetrafluoroethylene and 21 mole percent 3,3,3-trifluoropropene. Additional 7 wt. % ammonium persulfate/5 wt. % diammonium phosphate solution was added to maintain the polymerization. After 8000 grams of the second gaseous monomer mixture were added to the reactor, the reactor was cooled and depressurized to stop the polymerization. Cycle time was 17 hours. A 24.50 wt. % solids latex was obtained. The dipolymer was coagulated with calcium nitrate and dried.

Example 3

A TFE/TFP dipolymer was prepared by an aqueous semi-batch emulsion polymerization process of the invention, carried out at 80° C. in a well-stirred reaction vessel. 24.0 kg of a 0.5 wt. % solution of perfluorohexylethylsulfonic acid was charged to a 33 L reactor and heated to 80° C. The reactor headspace was pressurized to 0.79 MPa with a first gaseous monomer mixture of 97 mole percent tetrafluoroethylene and 3 mole percent 3,3,3-trifluoropropene. Polymerization was commenced by adding 200 mL of a solution containing 7 wt. % ammonium persulfate/5 wt. % diammonium phosphate. The reactor pressure dropped in response to polymerization. Reactor pressure was maintained at 0.79 MPa by addition of a second gaseous monomer mixture of 85 mole percent tetrafluoroethylene and 15 mole percent 3,3,3-trifluoropropene. Additional 7 wt. % ammonium persulfate/5 wt. % diammonium phosphate solution was added to maintain the polymerization. After 8000 grams of the second gaseous monomer mixture were added to the reactor, the reactor was cooled and depressurized to stop the polymerization. Cycle time was 24.3 hours. A 24.38 wt. % solids latex was obtained. The dipolymer was coagulated with calcium nitrate and dried.

Example 4

A TFE/TFP dipolymer was prepared by an aqueous semi-batch emulsion polymerization process of the invention, carried out at 80° C. in a well-stirred reaction vessel. 24.0 kg of a 0.5 wt. % solution of perfluorohexylethylsulfonic acid was charged to a 33 L reactor and heated to 80° C. The reactor headspace was pressurized to 1.34 MPa with a first gaseous monomer mixture of 95 mole percent tetrafluoroethylene and 5 mole percent 3,3,3-trifluoropropene. Polymerization was commenced by adding 200 mL of a solution containing 7 wt. % ammonium persulfate/5 wt. % diammonium phosphate. The reactor pressure dropped in response to polymerization. Reactor pressure was maintained at 1.34 MPa by addition of a second gaseous monomer mixture of 79 mole percent tetrafluoroethylene and 21 mole percent 3,3,3-trifluoropropene. Additional 7 wt. % ammonium persulfate/5 wt. % diammonium phosphate solution was added to maintain the polymerization. After 8000 grams of the second gaseous monomer mixture had been added to the reactor, the reactor was cooled and depressurized to stop the polymerization. Cycle time was 20.3 hours. A 25.22 wt. % solids latex was obtained. The dipolymer was freeze coagulated and dried.

Example 5

A TFE/TFP dipolymer was prepared by an aqueous semi-batch emulsion polymerization process of the invention, carried out at 80° C. in a well-stirred reaction vessel. 24.0 kg of a 0.5 wt. % solution of ammonium 3,3,4,4-tetrahydrotridecafluorooctanoate was charged to a 33 L reactor and heated to 80° C. The reactor headspace was pressurized to 1.34 MPa with a first gaseous monomer mixture of 97 mole percent tetrafluoroethylene and 3 mole percent 3,3,3-trifluoropropene. Polymerization was commenced by adding 200 mL of a solution containing 7 wt. % ammonium persulfate/5 wt. % diammonium phosphate. The reactor pressure dropped in response to polymerization. Reactor pressure was maintained at 1.34 MPa by addition of a second gaseous monomer mixture of 79 mole percent tetrafluoroethylene and 21 mole percent 3,3,3-trifluoropropene. Additional 7 wt. % ammonium persulfate/5 wt. % diammonium phosphate solution was added to maintain the polymerization. After 8000 grams of the second gaseous monomer mixture were added to the reactor, the reactor was cooled and depressurized to stop the polymerization. Cycle time was 20.7 hours. A 22.60 wt. % solids latex was obtained. The dipolymer was coagulated with aluminum sulfate and dried.

Example 6

A TFE/TFP dipolymer was prepared by an aqueous semi-batch emulsion polymerization process of the invention, carried out at 80° C. in a well-stirred reaction vessel. 24.0 kg of a 0.5 wt. % solution of perfluorohexylethylsulfonic acid was charged to a 33 L reactor and heated to 80° C. 14.4 grams of isopropanol chain transfer agent were also charged to the reactor. The reactor headspace was pressurized to 1.83 MPa with a first gaseous monomer mixture of 97 mole percent tetrafluoroethylene and 3 mole percent 3,3,3-trifluoropropene. Polymerization was commenced by adding 200 mL of a solution containing 7 wt. % ammonium persulfate/5 wt. % diammonium phosphate. The reactor pressure dropped in response to polymerization. Reactor pressure was maintained at 1.83 MPa by addition of a second gaseous monomer mixture of 69 mole percent tetrafluoroethylene and 31 mole percent 3,3,3-trifluoropropene. Additional 7 wt. % ammonium persulfate/5 wt. % diammonium phosphate solution was added to maintain the polymerization. After 8000 grams of the second gaseous monomer mixture had been added to the reactor, the reactor was cooled and depressurized to stop the polymerization. Cycle time was 30.7 hours. A 24.56 wt. % solids latex was obtained.

Comparative Example 1

A comparative emulsion polymerization process was run, substituting 3,3,4,4,5,5,6,6,6-nonafluoro-1-hexene for 3,3,3-trifluoropropene (TFP). 24.0 kg of a 0.5 wt. % solution of perfluorohexylethylsulfonic acid was charged to a 33 L reactor and heated to 80 C. The reactor headspace was pressurized to 1.03 MPa with a first gaseous monomer mixture of 97 mole percent tetrafluoroethylene and 3 mole percent 3,3,4,4,5,5,6,6,6-nonafluoro-1-hexene. Polymerization was commenced by adding 200 mL of a solution containing 7 wt. % ammonium persulfate/5 wt. % diammonium phosphate. The reactor pressure dropped in response to polymerization. Reactor pressure was maintained at 1.03 MPa by addition of a second monomer mixture of 85 mole percent tetrafluoroethylene and 15 mole percent 3,3,4,4,5,5,6,6,6-nonafluoro-1-hexene. Additional 7 wt. % ammonium persulfate/5 wt. % diammonium phosphate solution was introduced to maintain the polymerization. Monomer consumption slowed as the polymerization time increased and no measurable monomer consumption in the reactor was observed after 10 hours of feeding the 7 wt % ammonium persulfate/5 wt % diammonium phosphate solution. At this point an additional 110 mL of the persulfate/phosphate solution had been added. The reactor was maintained under monomer pressure for 14 more hours and a further 65 mL of 7 wt % ammonium persulfate/5 wt % diammonium phosphate solution were added over this period, however, no further monomer consumption was observed. Then the reactor was cooled and depressurized to stop the polymerization. A 7.14 wt. % solids latex was obtained. The dipolymer was coagulated with calcium nitrate and dried. This process was much slower than the process of this invention, stopping long before all available monomer had been polymerized, and yielded less dipolymer than when TFP was employed as the comonomer with TFE.

Comparative Example 2

A comparative emulsion polymerization process was run in an attempt to prepare a TFE/TFP dipolymer from a first gaseous monomer mixture containing more than 5 mol % 3,3,3-trifluoropropene. 24.0 kg of a 0.5 wt. % solution of perfluorohexylethylsulfonic acid was charged to a 33 L reactor and heated to 70° C. The reactor headspace was pressurized to 2.17 MPa with a first gaseous monomer mixture of 79 mole percent tetrafluoroethylene and 21 mole percent 3,3,3-trifluoropropene. 200 mL of a solution containing 7 wt. % ammonium persulfate/5 wt. % diammonium phosphate was added to the reactor in an attempt to initiate polymerization. The reactor pressure did not drop in response to monomer consumption, indicating little or no polymerization taking place. A further 105 mL of the 7 wt. % ammonium persulfate/5 wt. % diammonium phosphate solution was added to the reactor over 6 hours. No significant reduction in reactor pressure was observed over this time. No TFE/TFP dipolymer was produced from the process.

What is claimed is:

1. A semi-batch emulsion polymerization process for the manufacture of a dipolymer of tetrafluoroethylene and 3,3,3-trifluoropropene, said process comprising:

A) charging a reactor with a quantity of an aqueous solution;

B) pressurizing said reactor to a pressure between 0.3 and 10.0 MPa with a first gaseous monomer mixture consisting of between 100 and 95 mole percent tetrafluoroethylene and between 0 and 5 mole percent 3,3,3-trifluoropropene to form a reaction mixture;

C) polymerizing said reaction mixture in the presence of a free radical initiator to form a polymer dispersion while maintaining said reactor at said pressure and at a temperature between 25° C. and 130° C.; and D) feeding to said reactor a quantity of a second gaseous monomer mixture at a rate so as to maintain said pressure in said reactor, said second gaseous monomer mixture consisting of between 45 and 95 mole percent tetrafluoroethylene and between 5 and 55 mole percent 3,3,3-trifluoropropene to form a dispersed dipolymer of between 45 and 95 mole percent copolymerized units of tetrafluoroethylene and between 5 and 55 mole percent copolymerized units of 3,3,3-trifluoropropene.

2. The process of claim 1 wherein said aqueous solution comprises a fluorosurfactant.

3. The process of claim 2 wherein said fluorosurfactant is selected from the group consisting of ammonium perfluorooctanoate, perfluorohexylethylsufonic acid and ammonium 3,3,4,4-tetrahydrotridecafluorooctanoate.

4. The process of claim 1 further comprising feeding a chain transfer agent to the reactor.

5. The process of claim 1 wherein said pressure is maintained between 0.3 and 3 MPa.

6. The process of claim 1 wherein said temperature is maintained between 30° and 90° C.

7. The process of claim 1 wherein said second gaseous monomer mixture consists of 70 to 85 mole percent tetrafluoroethylene and 15 to 30 mole percent 3,3,3-trifluoropropene.

* * * * *